(12) United States Patent
Fiorentini et al.

(10) Patent No.: US 9,308,512 B2
(45) Date of Patent: Apr. 12, 2016

(54) METHOD AND HIGH-PRESSURE MIXING APPARATUS WITH SELF-REGENERATING SEAL

(71) Applicant: AFROS S.P.A., Caronno Pertusella (IT)

(72) Inventors: Carlo Fiorentini, Caronno Pertusella (IT); Maurizio Corti, Caronno Pertusella (IT)

(73) Assignee: AFROS S.P.A., Caronno Pertusella (IT)

( * ) Notice: Subject to any disclaimer, the term of this patent is extended or adjusted under 35 U.S.C. 154(b) by 12 days.

(21) Appl. No.: 14/178,505

(22) Filed: Feb. 12, 2014

(65) Prior Publication Data

US 2014/0234167 A1 Aug. 21, 2014

(30) Foreign Application Priority Data

Feb. 15, 2013 (IT) .................................. MI13A0216

(51) Int. Cl.
| | |
|---|---|
| *B29B 7/76* | (2006.01) |
| *B01J 19/00* | (2006.01) |
| *B29B 7/80* | (2006.01) |
| *B29C 67/24* | (2006.01) |
| *B29C 44/12* | (2006.01) |

(52) U.S. Cl.
CPC ............ *B01J 19/0073* (2013.01); *B29B 7/7663* (2013.01); *B29B 7/7668* (2013.01); *B29B 7/7684* (2013.01); *B29B 7/80* (2013.01); *B29B 7/805* (2013.01); *B29C 44/1271* (2013.01); *B29C 67/246* (2013.01)

(58) Field of Classification Search
CPC .................................... B29B 7/76; B29B 7/80
USPC ............ 366/138, 159.1, 162.4–162.5, 167.1, 366/173.1; 422/131, 133–135; 239/418, 239/422, 426, 428, 433, 434
See application file for complete search history.

(56) References Cited

U.S. PATENT DOCUMENTS

| | | | |
|---|---|---|---|
| 4,721,391 A | | 1/1988 | Bauer |
| 5,164,162 A | * | 11/1992 | Ridenour ....................... 422/131 |
| 5,785,422 A | | 7/1998 | Eidenmuller |
| 2006/0104155 A1 | * | 5/2006 | Corti et al. .................. 366/164.4 |
| 2008/0128209 A1 | * | 6/2008 | Fiorentini et al. ................. 184/6 |
| 2015/0174540 A1 | * | 6/2015 | Volpato et al. |

FOREIGN PATENT DOCUMENTS

| | | |
|---|---|---|
| DE | 8915329 | 4/1990 |
| EP | 1992466 | 11/2008 |
| EP | 2767376 A1 * | 8/2014 |
| FR | 1376485 | 10/1964 |
| GB | 2098876 | 12/1982 |

* cited by examiner

*Primary Examiner* — Charles Cooley
(74) *Attorney, Agent, or Firm* — Silvia Salvadori, P.C.; Silvia Salvadori

(57) ABSTRACT

A method for forming a self-regenerating seal in a mixing chamber of a high-pressure mixing apparatus for polymeric components suitable for providing a reactive mixture for a polymerizable resin. An annular sealing element is provided in a circular housing seat inside the mixing chamber, in a sealing zone downstream the injection holes for the polymeric components; worn and/or torn parts of the annular sealing element are automatically regenerated by the same reactive mixture delivered during operation of the mixing apparatus. A high-pressure mixing apparatus with self-regenerating sealing element is also claimed.

6 Claims, 10 Drawing Sheets

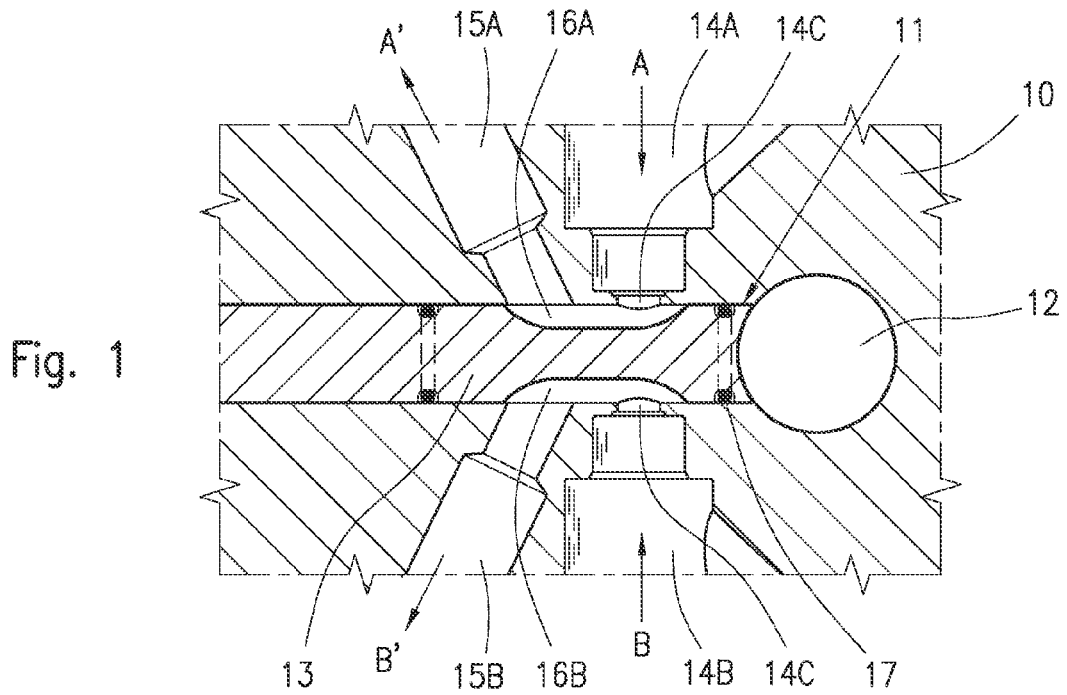
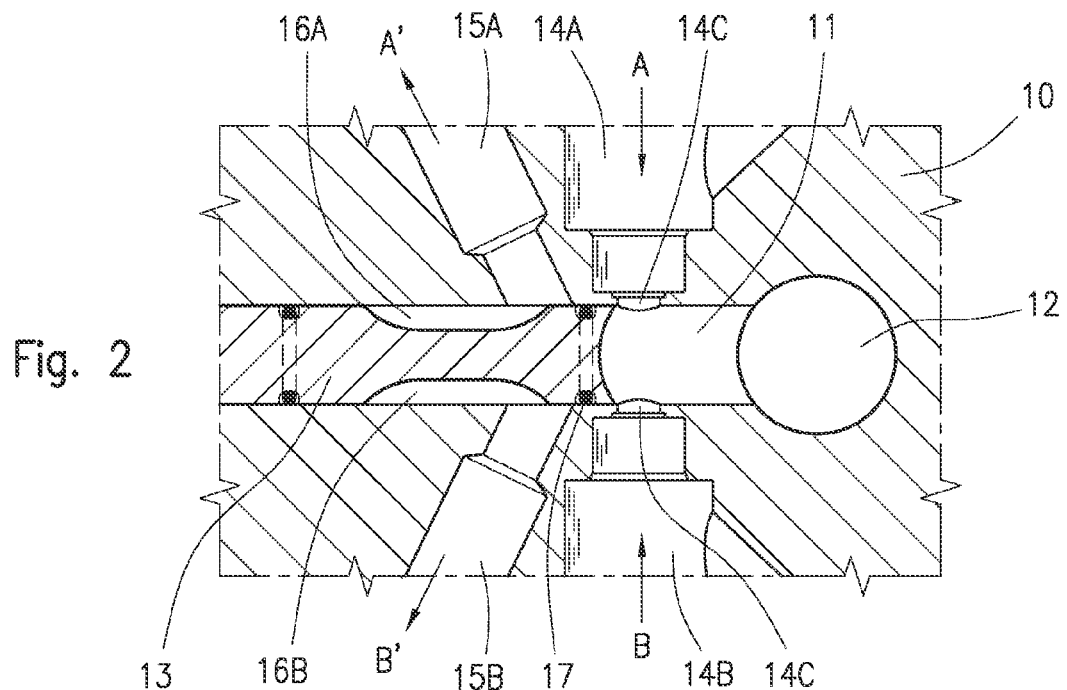

METHOD AND HIGH-PRESSURE MIXING APPARATUS WITH SELF-REGENERATING SEAL

This U.S. Non-Provisional application claims priority to and the benefit of Italian Application No. MI2013A000216 filed on Feb. 15, 2013, the content of which is incorporated by reference in its entirety.

BACKGROUND OF THE INVENTION

The present invention refers to a high-pressure mixing apparatus for polymeric components for a reactive chemical, mixture of a polymerisable resin, and more properly refers to a method for providing a self-regenerating seal in the mixing chamber of the mixing apparatus, in which a recirculation valving member for the polymeric components slides.

PRIOR ART

The high-pressure mixing apparatuses for polymeric components that are suitable to provide reactive chemical mixtures for polymerisable resins, have been developed in various ways over time; a self-cleaning high-pressure mixing apparatus, usually comprises at least one mixing chamber in which two or more polymeric components are impinging with great kinetic energy to form a reactive mixture, and in which the resulting reactive mixture outcoming the mixing chamber flows into a delivering conduit to be injected or fed into a mould.

The mixing apparatus further comprises a sliding valve member or spool slidable in the mixing chamber, which is provided with longitudinal grooves for the recirculation of the single chemical components in the closed condition of the apparatus; the sliding valve member is axially movable between a retracted position, in which both injection holes for the chemical components and the mixing chamber open to the delivering conduit, and an advanced position for recirculation of the single polymeric components, in which closes the mixing chamber, expelling the residual mixture directly into the delivering conduit.

The residual mixture is in turn ejected from the delivering conduit by a cleaning member, consisting of a cylindrical pin that closes the front side of the valve member and of the mixing chamber, preventing the chemical components from leaking outwards.

The role of the delivering conduit is normally to reduce the turbulence of the mixture and, for this reason, it is advisable that it is as long as possible; a mixing apparatus of the mentioned type is for example disclosed in U.S. Pat. No. 4,332,335.

In apparatuses of this type the reacted mixture tends, however, to stick the cleaning pin to the inner surface of the delivering conduit. The conduit length cannot therefore exceed about 6 to 7 times the diameter of the conduit; otherwise, the sticking forces would give rise to great stresses, to excessive fatigue and gripping during sliding and removal, motion for the reacted layer of resin that has been adhered to the opposite walls of the cleaning pin and of the delivering conduit.

In order to overcome this problem, it is possible to use a cleaning member configured with a short front head suitable for expelling the foam, which thus sticks to a limited surface of the delivering conduit, connected to the piston of a hydraulic control cylinder by a stem of reduced diameter.

In order to avoid, during recirculation of the chemical components with the cleaning member in the advanced closed position, that the single chemical components can leak into the portion of the delivering conduit where the stem of reduced diameter of the cleaning member extends, on the sliding valve member one or more annular sealing elements are normally arranged and housed in circular seats, that in the advanced condition of the sliding valve member prevent the polymeric chemical components from leaking into the delivering conduit where, in use, they can accumulate to form agglomerates that prevent a correct sliding thereof and tend to escape outside, polluting the reacting mixture that has been delivered into a mould.

High-pressure mixing apparatuses are disclosed, for example, in U.S. Pat. No. 4,332,335, DE 891.5329, U.S. Pat. No. 5,785,422 and EP 1927448.

In particular, U.S. Pat. No. 5,785,422 and EP 1927448 illustrate a high-pressure mixing apparatus, having an "L" shaped mixing chamber and delivering conduit, in which the self-cleaning member of the delivering conduit, as previously mentioned, comprises a piston head of comparatively reduced length with respect to the delivering conduit, at the front end of a long stem operatively connected to a hydraulic actuator. The stem has a smaller diameter than the piston head and the internal diameter of the delivering conduit; between the stem and the internal surface of the delivering conduit, in the closed condition of the apparatus, an annular space is provided that substantially reduces the contact and sticking surfaces.

Nevertheless, with this conformation of the cleaning member for the delivering conduit, in the closed condition of the apparatus it is necessary to prevent that the single reactive chemical components leak from the sliding valve member, as by entering and reacting into the annular space of the delivering conduit, they would form particles of reacted material that would hinder the correct sliding of the cleaning member, until to block the movement thereof if the accumulation of reacted particles is trapped, or tend to exit outside, polluting the reactive mixture that has been delivered into a mould.

In order to prevent the polymeric components, with the mixing chamber in a closed condition, can leak through the small clearance existing between the sliding valve member and the inner wall of the mixing chamber, in general it has been proposed to provide the sliding valve member with suitable annular seals.

However, by using simple annular seals on the sliding valve member, provided by a reacted resin, has not in fact solved the problem because, owing to the reciprocating movement of the valve member between the closed and the open condition of the mixing chamber, the annular seals slide along the front side and the corners of the holes for injection and recirculation of the polymeric components; consequently, these seals tend to wear out rapidly. In conventional mixing apparatuses it is thus necessary to stop repeatedly and frequently, with long production downtime, because of the cleaning and maintenance work that is necessary to replace and/or restore the worn seals.

In U.S. Pat. No. 3,799,199 has been suggested to configure the sliding valve member of the mixing chamber, with cross grooves that intersect a plurality of longitudinal grooves opening towards the mixing chamber, to enable the reactive mixture to flow back and polymerize, providing sealing ribs that longitudinally and transversely extend.

This solution is not completely suitable because during the recirculation step of the reactive components, the sliding valve member is in a closed position and a pressure builds up in the recirculation grooves resulting from the sum of the pressure existing in the storage tanks for the chemical components, plus the pressure drop to allow each component to flow in the respective circulation ducts and members.

In general, the pressure drop is proportional to the viscosity and to the flowrate of the resin of the single chemical component; thus the pressure drop is greater the greater the viscosity of the single component, with a same flowrate and pipe diameter.

The flowrates are normally comparable and vary from 1.6/1 to 1/3 between a less viscous and a more viscous component, whilst the ratio between the viscosities of each component varies from 3.5 to 20, depending on applications.

In the recirculation grooves of the valving member, pressures up to 40, 50 bars can raise during recirculation, which can be unbalanced between one another up to 20 bars.

These pressure differences mean that between the recirculation grooves and the delivering conduit, on the damaged sides of the sealing ribs, a leak of the separate chemical components could occur, thus preventing the regeneration of the seal.

Whilst the recirculation grooves are washed by the recirculating flow of the chemical components, the leaking components meet in the delivering conduit, react with one another, or with the humidity of the air, forming encrustations that make the operation of the mixing apparatus deteriorate.

During mixing, on the other hand, the pressure in the mixing chamber is very small, normally lower the pressure in the longitudinal grooves of the sliding valve member, for which reason in U.S. Pat. No. 3,799,199 the reactive mixture cannot flow back and restore the worn parts of the seals.

OBJECTS OF THE INVENTION

The main object of the present invention is to provide a method for self-regenerating seals in a high-pressure mixing apparatus of the previously mentioned type, in which the problem of the seal between the mixing chamber and the sliding valve member, consequently the wear problem of the seals, has been differently addressed and solved.

A further object of the invention is to provide a method, as disclosed above, and a high-pressure mixing apparatus, for example of the type disclosed in U.S. Pat. No. 5,785,422 or EP 1927448, in which the problems relating to the wear of the seal of the mixing chamber, and the leakage problem of the polymeric chemical components have been practically eliminated.

A still further object of the invention is to provide a method and a high-pressure mixing apparatus, in which the seal between the sliding valve and the mixing chamber is continuously regenerated automatically, during use, substantially reducing the time and the number of maintenance interventions.

SHORT DESCRIPTION OF THE INVENTION

The objects mentioned above are achievable by a method according to claim 1 and by a high-pressure mixing apparatus according to claim 7. The solution to the problem essentially consists in providing at least one annular sealing element of a polymeric resin, housed in a circular seat on an inner surface of a mixing chamber downstream the injection holes for the chemical components, while worn and/or torn parts of the sealing element are automatically regenerated by the same reactive mixture that polymerizes into the worn and/or torn parts of the sealing element during delivering of the reactive mixture and operation of the mixing apparatus.

According to the invention, a method has thus been provided for forming a self-regenerating seal into a mixing chamber of a high pressure mixing apparatus, comprising the steps of:

feeding a first and at least a second polymeric component to the mixing chamber through injection holes, to form a reactive polymeric mixture, to be dispensed by a delivery conduit, in which a slidable valve member is reciprocable in the mixing chamber between a retracted position, and an advanced position to open and respectively to close the injection holes and the mixing chamber in respect to the delivery conduit;

providing at least one circular seat for housing an annular sealing element on an inner surface of the mixing chamber in a sealing zone downstream of the injection holes;

providing an annular sealing element in said at least one housing seat by a polymerisable resin; and automatically regenerating worn and/or torn parts of the annular sealing element, by allowing the reactive mixture to fill up and polymerize into the worn and/or torn parts of the sealing element, inside the housing seat.

According to the invention a high-pressure mixing apparatus has been also provided suitable for forming a self-regenerating seal a polymeric mixture of a first and at least a second reactive polymeric component according to the method referred to above, the apparatus comprising:

a body portion provided with at least a cylindrical mixing chamber having injection holes for the reactive components opening onto an inner surface of the mixing chamber;

a delivery conduit for dispensing the polymeric mixture, the delivery conduit transversely extending to and being in communication with an outlet side of the mixing chamber;

a valve member slidably reciprocable in the cylindrical mixing chamber; and at least one annular sealing element between the valve member and the mixing chamber, said annular sealing element being housed in a circular seat, provided on the inner surface of the mixing chamber, in a sealing zone between the outlet side of the mixing chamber and the injection holes.

Preferably, the delivering conduit consists of a bush removably housed in a cylindrical seat of the body of the mixing apparatus.

According to a preferred embodiment, the mixing apparatus is of the type comprising a cleaning member for the delivering conduit provided with a piston head at the front end of a stem having a comparatively reduced diameter that extends coaxially with the delivering bush, and is connected to a hydraulic control actuator.

SHORT DESCRIPTION OF DRAWINGS

These and further features of the method and of the apparatus according to the present invention will be clearer from the description that follows and from the attached drawings relating to certain preferred embodiments, in which:

FIG. 1 an enlarged detail of the mixing chamber of a high-pressure mixing apparatus of conventional type, with the sliding valve member in an advanced position;

FIG. 2 is the same detail of FIG. 1 with the sliding valve member in a retracted position;

DETAILED DESCRIPTION OF THE INVENTION

Figure 3:
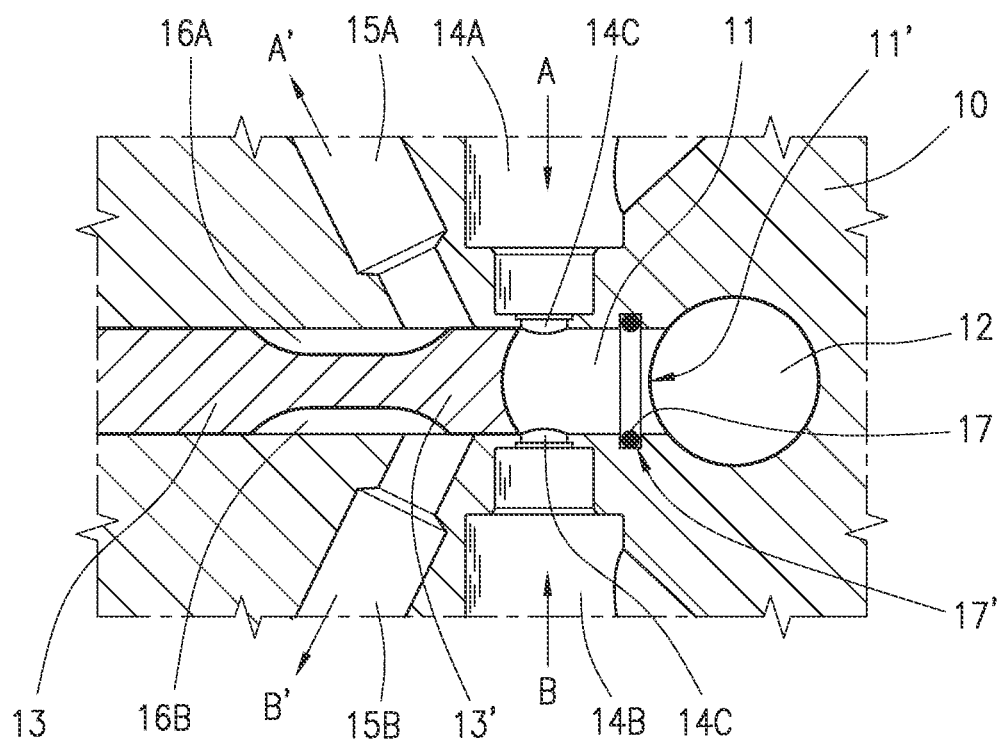
FIG. 3 is a detail similar to FIG. 2 for a high-pressure mixing apparatus, according to the invention.

FIGS. 1 and 2 show, by way of example, the detail of the mixing chamber of a high-pressure mixing apparatus of conventional type, belonging to the prior art preceding the present invention.

In FIG. 1, with the reference number 10 the body portion of the mixing apparatus has been indicated, in which a hole has been provided defining a mixing chamber 11 in which reciprocates a sliding valve member 13 for controlling the flows of the chemical components to be mixed slides, which is also suitable for performing the function of cleaning member for the chamber 11; the mixing chamber 11 communicates with a delivery conduit 12 for dispensing a reactive mixture, for example a polyurethane mixture obtained from a first and from at least a second polymeric component, such as a polyole and an isocyanate, in which the conduit 12 is oriented in an orthogonal direction, transversely to the mixing chamber 11.

On two opposite sides of the mixing chamber 11 openings 14C of the injectors 14A, 14B are provided for the supply of respective polymeric components A and B that are suitable for forming a reactive mixture, for example a polyurethane mixture for the production of rigid or flexible foams; with 15A and 15B the recirculation openings for the single components have been further indicated, in a manner that is per se known.

Inside the mixing chamber 11 the valve member 13 slides, which is operatively connected to a hydraulic control actuator, which is not shown. The sliding valve member 13 is provided with two longitudinal slots 16A and 16B having a length equal to or greater than the space between the axis of each injector 14A, 14B and the axis of the respective opening 15A, 15B for the recirculation of the single polymeric components A, B, in the closed condition of the apparatus.

Still with reference to FIGS. 1 and 2, the front end of the valve member 13 has an annular seal element 17 to prevent in the advanced condition of FIG. 1, in which the mixing chamber 11 closes towards the delivering conduit 12, the single polymeric components A and B being able to leak towards the delivering conduit 12 whilst they are recirculated to the openings 15A and 15B and to respective storage tanks.

In conventional mixing apparatuses, the seal 17, which can be formed by a reactive resin, is normally housed in a seat obtained at the front end of the valve member 13; thus, at each axial movement of the valve member 13, the seal 17, sliding along the mixing chamber 11, passes repeatedly in front of the openings 14C of the nozzles 14A and 14B; consequently the seal 17 rubs against the corners of these openings 14C, wearing down and becoming lacerated after a certain amount of time, at the end of which the mixing apparatus has to be removed and dismantled for the necessary maintenance operations and replacement of the worn seals.

This drawback is eliminated by the method and the high-pressure mixing apparatus according to the present invention.

With reference to FIG. 3, the innovative features of the self-regenerating seal according to the invention will now be described, with reference to a conventional mixing apparatus; in FIG. 3 the same reference numbers of FIGS. 1 and 2 have been used to indicate similar or equivalent parts.

By comparing FIG. 3 with FIG. 2, the annular seal element 17 for the mixing chamber 11 has now been housed in a circular slot 17', provided on the internal surface of the mixing chamber 11, in a seal zone downstream of the injection holes 14C for the polymeric components, near the outlet opening 11', and more properly in a seal zone comprised between said outlet 11' and the injection holes 14C. For greater clarity, it is pointed out that the seal zone of the mixing chamber 11, in which the seal gasket 17 is positioned, substantially has to correspond to the cylindrical front portion 13' of the valve member 13, comprised between the front end of the valve member 13 and the recirculation slots 16A, 16B, in the advanced condition of the valve member in which closes the mixing chamber.

Figure 4:
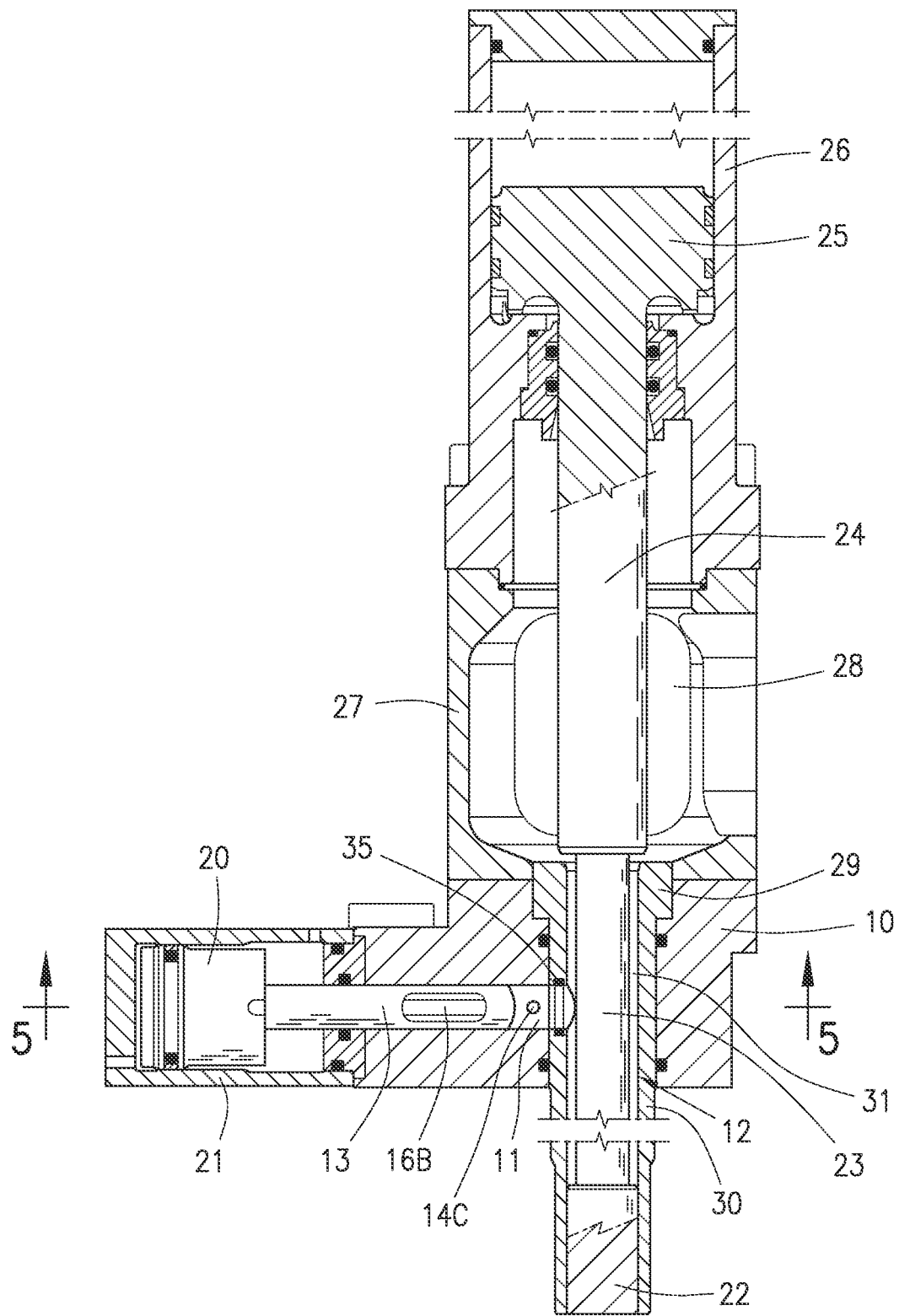
FIG. 4 is a longitudinal sectional view of another embodiment of a high-pressure mixing apparatus, according to the invention.
Figure 5:
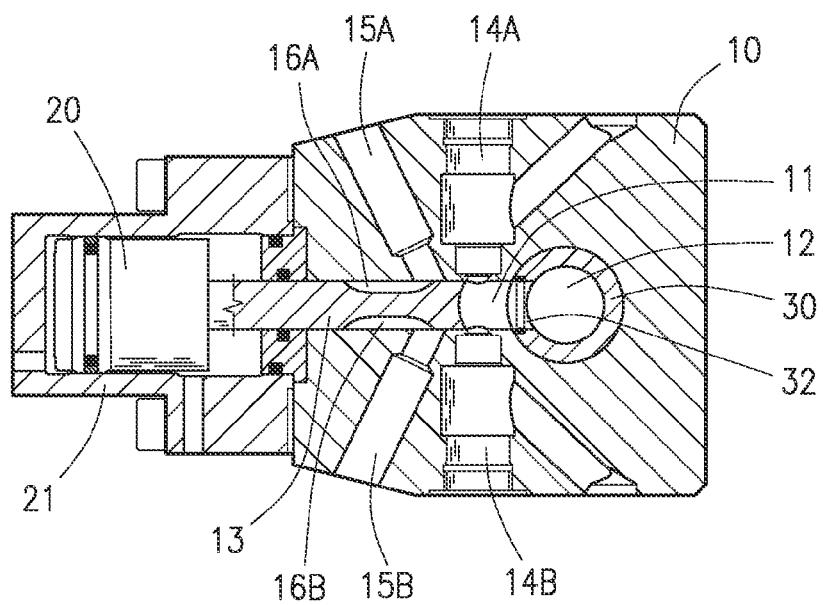
FIG. 5 is a cross sectional view according to line 5-5 of FIG. 4.
Figure 6:
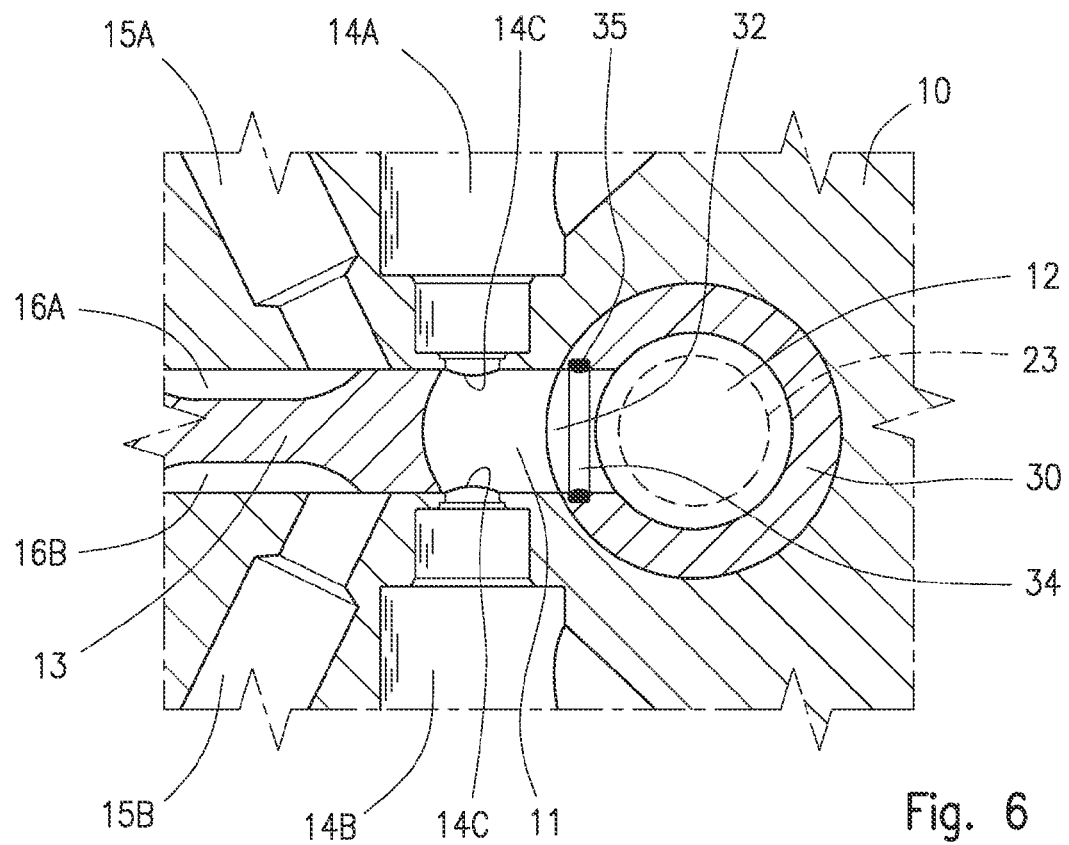
FIG. 6 is an enlarged detail of FIG. 5.

As previously mentioned, the high-pressure mixing apparatus can be of any type and shape; a preferred embodiment thereof is represented, by way of example, in FIGS. 4 and 5 of the drawings.

As shown in the aforesaid figures, in which the same reference numbers as for the preceding figures have again been used to indicate similar or equivalent parts, the mixing apparatus again comprises a body 10 in which a cylindrical bore is obtained defining the mixing chamber 11, in which the holes 14C for the injectors 14A, 14B and the recirculation holes 15A, 15B of the single polymeric components A, B, open.

Also in this case, in the mixing chamber 11 slide a first cleaning member consisting of a valve member 13 configured with longitudinal slots 16A, 16B; the valve member 13 is in turn operatively connected to the piston 20 of a hydraulic actuator 21.

The mixing chamber 11 communicates with a delivering conduit 12 arranged orthogonally to the chamber 11, in which a second cleaning member slide, consisting, in the specific case, of a pin member configured with a short front cylindrical head 22, having a length comparatively reduced with respect to the conduit 12, and a diameter of a few hundredths of a millimeter less than the diameter of the conduit 12. The head 22 of the cleaning member is connected to a control stem 23 having a comparatively lesser diameter, in turn connected to the stem 24 of the piston 25 of a second hydraulic actuator 26; the hydraulic actuator 26 in turn is removably fixed to the body 10 of the mixing apparatus, by a hollow spacer 27 having side openings 28.

The mixing apparatus according to the present invention differs from conventional mixing apparatuses by the different conformation of the delivery conduit 12 and of the seal between the cleaning member 13 and the mixing chamber 11.

According to the embodiment of FIGS. 4 and 5 the conduit 12 for delivering the reactive mixture is provided longitudinally into a bush 30, which extends orthogonally to the mixing chamber 11; the bush 30 is removably housed in a cylindrical seat of the body 10, protruding beyond the body 10; the rear end of the bush 30 has a widened head 29 into an opposite seat of the body 10 and is retained by the spacer 27, which is removably fixed to the body 10. Also the bush 30 with the delivering conduit 12 is thus fastened to the body 10 and is removable simply by sliding; thus, after removing the spacer 27 with the actuator 26, it is possible to remove both the bush 30 and the second cleaning member 22, 23 for the necessary maintenance operations, or to replace them with a new bush and/or with a new cleaning member 22, 23 of the same type or of a different type.

From FIG. 4 it is further shown that the stem 23 of reduced diameter extends at the rear from the head 22 along the hole of the delivering conduit 12; thus, between the stem 23 and the internal surface of the delivering conduit 12, in the advanced condition, an annular space 31 is formed that opens at the rear to the hollow spacer 27, to the exterior.

This solution of the cleaning member 22, 23, in combination with the self-regenerating seal of the mixing chamber 11, enables the performance of the mixing apparatus to be improved further.

In order to ensure a laminar flow of the mixture jet that exits the delivering conduit 12, and to enable the same conduit 12 to enter the cavities of the foaming member, it is desirable for the conduit 12 and the bush 30 to be as long as possible. Currently, conduits 12 are used which are 5 to 6 times longer than the diameter; for certain applications, the conduit 12 has to be 10 to 15 times the diameter thereof.

In these conditions, if the cleaning member of the delivering conduit 12 were totally cylindrical, of a constant diameter and of significant length, it would sealingly close the end of the mixing chamber at the front of the valve member; nevertheless, an excessive length of the cleaning member of the delivering conduit 12, would create opening problems, because of the sticking between contact surfaces caused by the reacted polymer, and overheating during the repeated reciprocal movements.

For these reasons, it is advisable to use a cleaning member provided with a short piston head 22, as shown in FIG. 4.

Nevertheless, with a cleaning member provided with a piston head, the resins that leak from the valve member in the closed position, are pushed outwards, polluting the product; or the resins that form the reactive components A, B, penetrating the annular space 31 of the delivering conduit 12, would be scraped towards the spacer 27 where they would accumulate as a sticking residue, also including residues of reacted material, in this manner the good operation of the apparatus would be compromised.

If the cleaning member of the conduit 12 were maintained in the retracted open position, the resins that exit seeping from the valve member in the closed position would drip through the delivering conduit, onto the piece damaging the same piece.

For these reasons, and for the purposes of the present invention, in the advanced closed condition of the valve member 13 and if the delivering conduit 12 is kept clean by a sliding element configured with different diameters, it is indispensable to ensure a good seal between the mixing chamber 11 and the delivering conduit 12.

With reference to FIGS. 4-8, the innovative features of the apparatus and of the method for self-generating a seal between the valve member 13 and the mixing chamber 11 will be now disclosed in greater detail.

From the various figures it is in fact noted that the bush 30, in an intermediate position, has a cross hole 32 that is axially aligned to the mixing chamber 11, constituting in the specific case an extension of the same mixing chamber; the cross hole 32 is thus configured with a cylindrical internal surface 33 (FIGS. 7 and 8) consisting of an extension of the cylindrical internal surface 11.1 (FIGS. 6 and 7) of the mixing chamber 11, which is open to the delivery conduit 12.

In the internal surface 33 of the cross hole 32 of the bush 30, at least one circular slot or seat 34 has thus been obtained in which an annular sealing element 35 is housed for the necessary seal between the mixing chamber 11 and the valve member, in respect to the delivery conduit 12, in the totally advanced condition of the valve member 13 in which closes the mixing chamber 11; in the case shown, the circular housing seat 34 has a rectangular a cross section, but other forms of the housing seat and of the sealing element are possible, as explained below.

Figure 7:
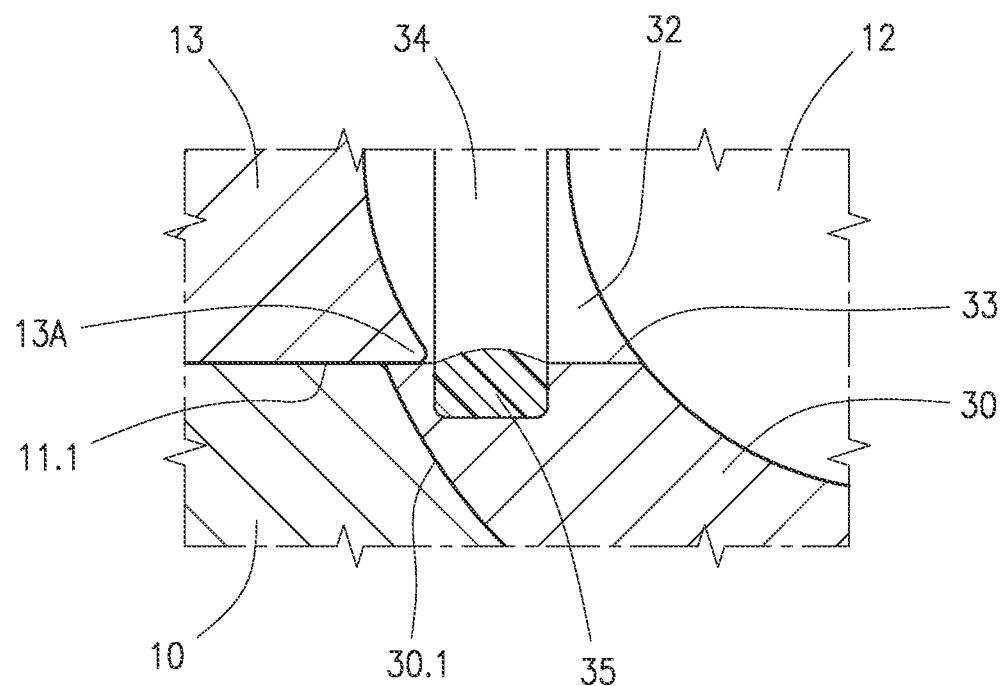
FIG. 7 is a further enlarged detail of FIG. 6, showing the seat with the initial annular sealing element.

The annular sealing element 35 can be formed in various ways; for example can be initially obtained by spreading into the housing seat 34, and filling the housing seat 34 with any synthetic resin that suitable for the purpose, with a possible filler and polymerised after application; the excess of solidified material is then removed, leaving a slight swelling towards the inside, as shown in FIG. 7. Alternatively, the annular sealing element 35 can be provided by the same reactive mixture that initially fills and polymerizes in the housing seat 34.

In the embodiment of FIG. 7, the housing seat 34 is "closed" to both sides of the bush 30, whereas it is radially "open" to the inside of the cross hole 32; nevertheless, as shown in the remaining embodiments, the housing seat 34 at one or both sides could be opened inside and outside the bush 30; in this case the seal element 35 would also seal the contact zone 30.1 consisting of the interface between the bush 30 and the body 10 of the mixing apparatus; nevertheless, it is necessary to form the annular seal element with protuberances or with continuous and/or discontinuous circular beads that engage in corresponding seats of the cross hole of the bush 30, to retain the seal element, or to prevent a possible axial running of the resin that is dragged by the valve member.

According to the embodiment under consideration, having formed the initial annular seal element 35 in a housing slot or seat 34 inside the cross hole 32 of the bush 30, in replacement of the usual, annular seal element normally provided on the valve spool 13, permits numerous advantages, both from the constructional and functional point of view.

From the constructional point of view it is clear that as the bush 30 is separate and removable from the body 10 of the apparatus, it is easier to operate to initially form the annular seal element 35, before assembling the mixing apparatus. This operation can also be performed subsequently by removing in an extremely easy manner the bush 30 when necessary, during a maintenance operation, or when a bush has to be replaced with another one of a different type, or to replace it when the bush is worn.

Providing the annular seal element 35 in the housing seat 34 of the cross hole 32 of the bush 30, or more in general near the outlet opening of the mixing chamber 11, also brings certain functional advantages.

Figure 8:
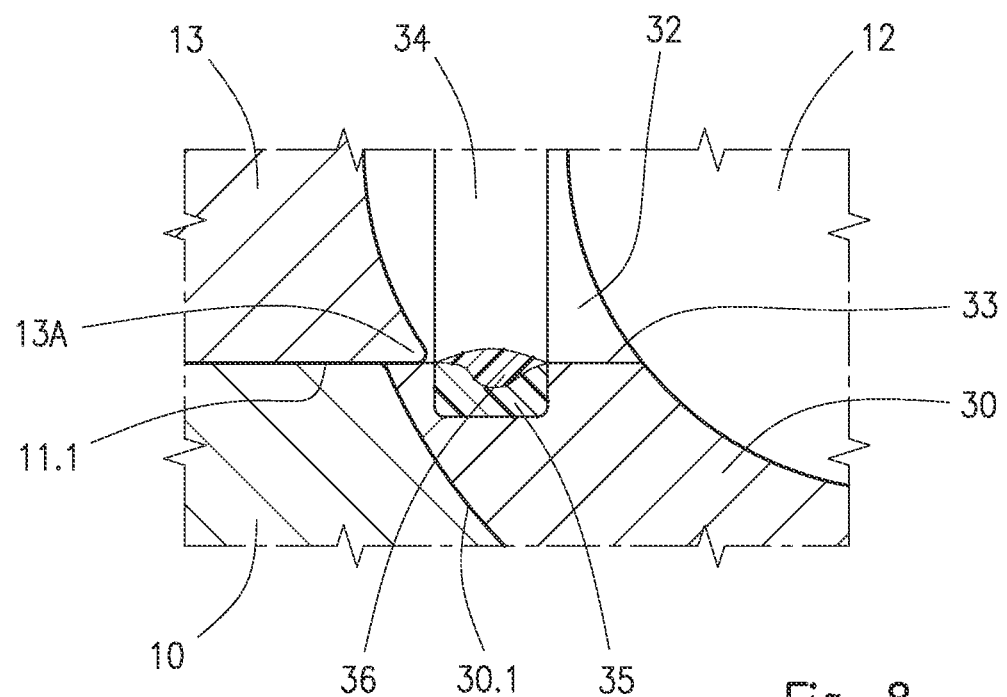
FIG. 8 is a detail similar to FIG. 7 showing the worn and self-regenerated annular sealing element.

This can be explained more fully with reference to FIGS. 7 and 8; FIG. 7 shows the original annular seal element 35, whole and devoid of worn parts or form parts. Nevertheless, the valve member 13, through repeatedly reciprocating movement at each opening and closing of the mixing apparatus, tends to wear down or torn over time the seal element 35, removing part of the original resin, as shown in FIG. 8; in this manner the seal would be compromised.

Nevertheless, according to the present invention, having positioned the annular seal element 35 no longer on the valve member 13 of the mixing chamber 11, but into the cross hole 32 of the bush 30 of the delivering conduit, or more in general in a housing seat provided on the inner surface of the mixing chamber 11, as previously mentioned, permits self-generation of the seal by the same reactive mixture; in fact, at each delivering or dispensing slot, the reactive mixture outcoming from the mixing chamber 11 flows to the delivery conduit 12, fills and polymerizes in the cavities or in the worn parts, or lacerations in the sealing element 35; this has been clearly shown with the reference number 36 in FIG. 8. The sealing member 35 can be continually regenerated, extending in this manner the working life of the mixing apparatus.

Figure 9:
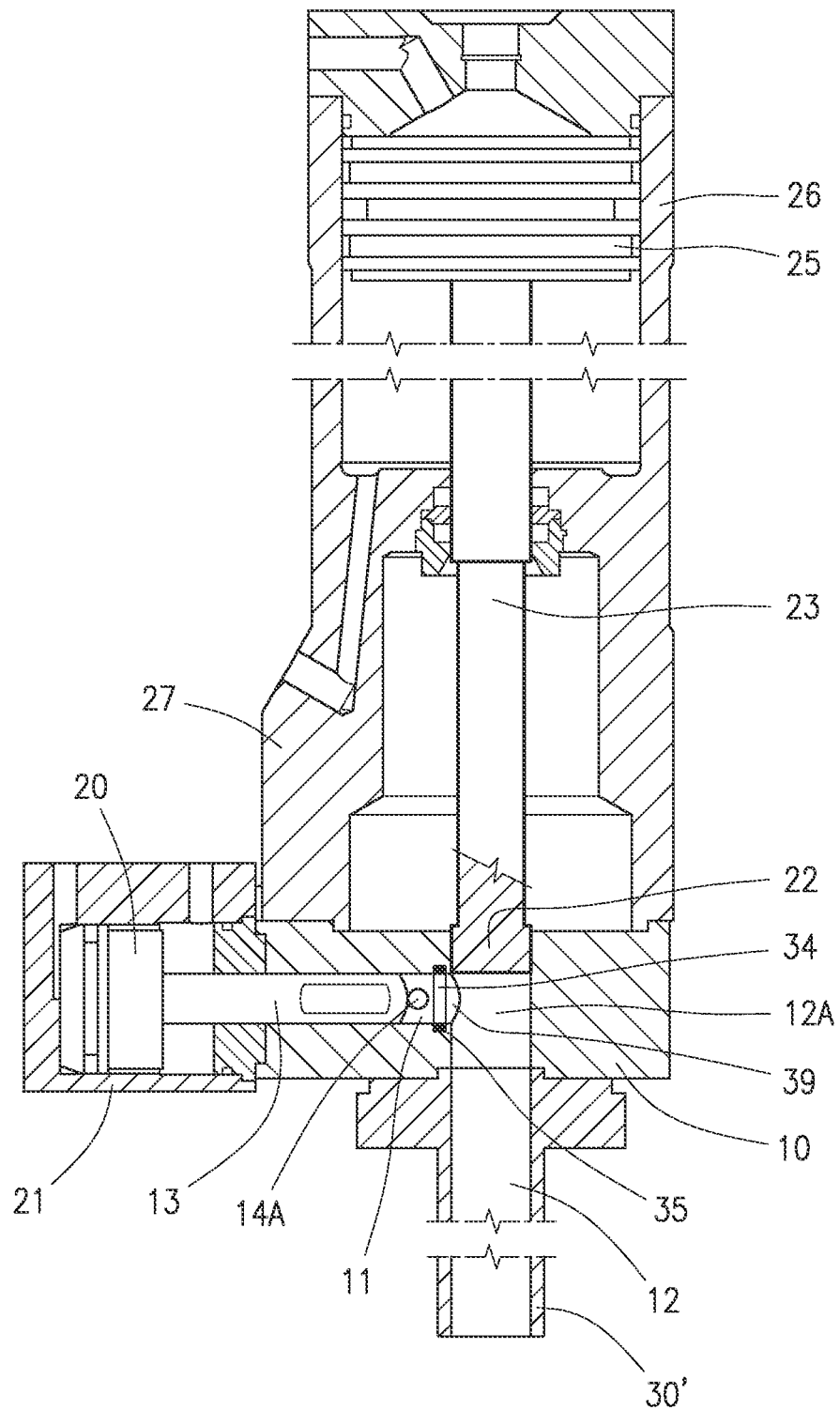
FIG. 9 is a longitudinal sectional view of a further embodiment of a high-pressure mixing apparatus, according to the invention.

FIG. 9 shows a second embodiment of a high-pressure mixing apparatus provided with a self-regenerating seal according to the present invention; the mixing apparatus of FIG. 9 differs from the apparatus illustrated in FIGS. 4 to 8 by in that the conduit 12 for delivering the mixture is now formed in an external bush 30', axially aligned to a cylindrical hole 12A, of the same diameter, directly provided in the body 10 of the mixing apparatus, orthogonally to the mixing chamber 11; other solutions are nevertheless possible in terms of features of the mixing apparatus, the use of a self-regenerating seal 35 according to the present invention remaining unchanged.

In particular FIG. 9, similarly to FIG. 3, shows an annular sealing element 35 in a housing seat 37 on the internal surface of the mixing chamber 11, at the outlet end 39 that communicates with the delivery conduit 12, 12A. The annular sealing element 35 performs the same function as the annular sealing element 35 of the example of FIGS. 4-8 and is made in a manner completely similar to the latter, i.e. coating and filling the housing seat 34 with a synthetic resin, i.e. enabling the reactive mixture to fill the housing seat 34 subsequently, leaving the reactive mixture to polymerize.

Also this second embodiment of the invention has the advantage that the annular sealing element 35, similarly to the annular sealing element previously disclosed, is self-regenerated during use by the reactive mixture dispensed by the apparatus.

FIGS. 10 to 14 show further variants and further features of the self-regenerating seal according to the present invention.

Figure 10:
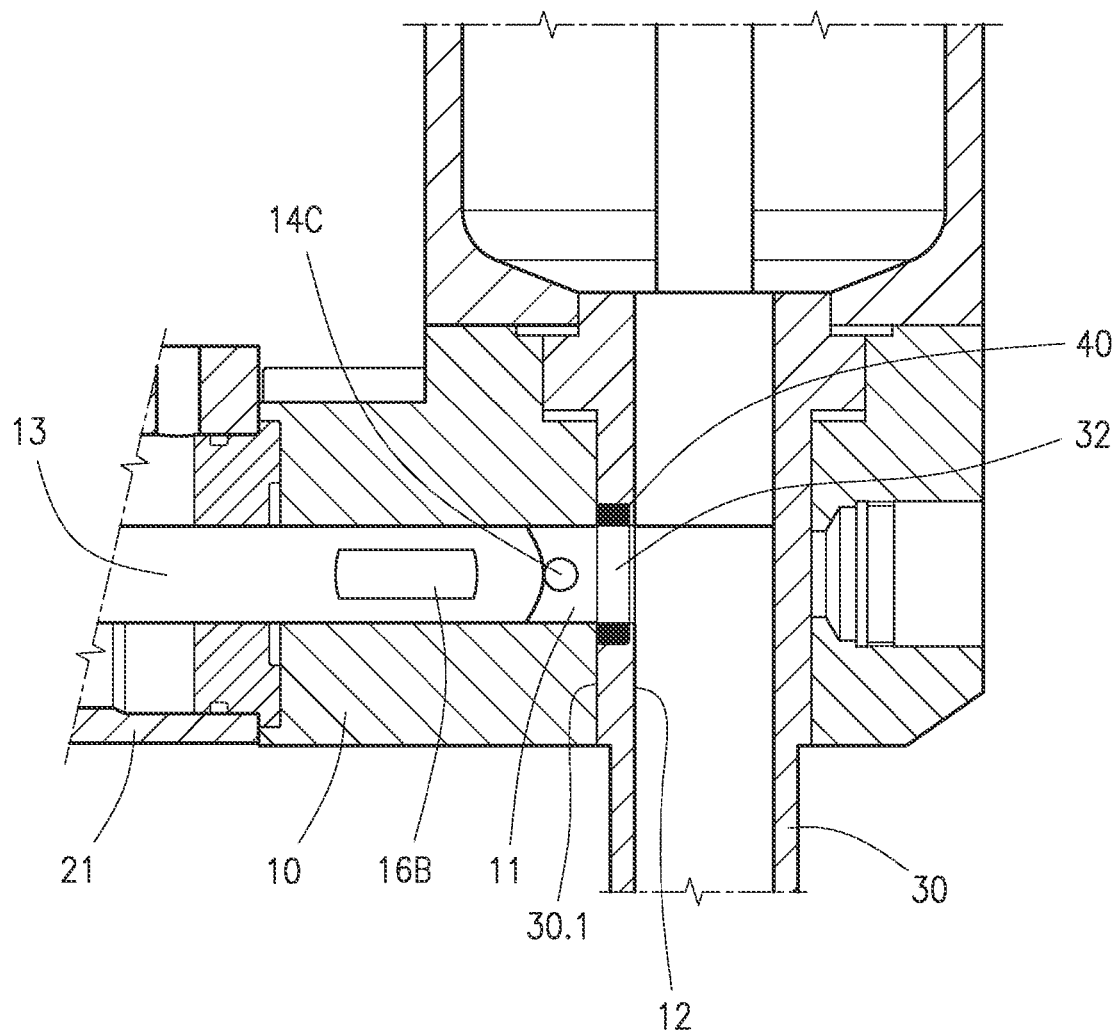
FIG. 10 is a detail of a first version of the annular seal element of the embodiment illustrated in FIGS. 5 to 8.

Whilst in the case of FIGS. 4-8 the annular sealing element 35 is housed in a seat 34 provided on the inner surface 33 of the cross-hole 32 of the bush 30, in which the seat 34 consists of an annular groove closed on both sides as shown in FIG. 8, the seal 34 being on the other hand open radially to the inside of the mixing chamber 11 so that the seal contact occurs between the internal surface of the sealing element 35 and the cylindrical surface of the valve member 13, in the case of FIG. 10 the cross hole 32 of the bush 30, which constitutes an extension of the front end of the mixing chamber 11, is configured with an annular housing seat that is open both radially towards the cross hole 32 and on one side towards the interface 30.1 between the outer surface of the bush 30 and a mating surface of the body 10; in this manner the annular sealing element 40 is allowed to be extended as far as the contact interface 30.1. A dual seal is thus obtained, both towards the valve member 13 of the mixing chamber 10, and between the bush 30 and the body 10 of the apparatus, by means of an annular sealing element 40 having a rectangular cross-sectional shape.

Figure 11:
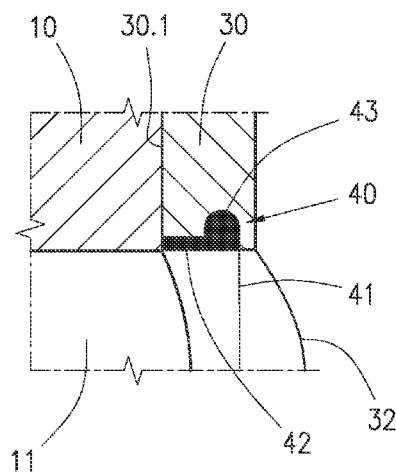
FIGS. 11-14 show enlarged details of other embodiments of the annular sealing element of the embodiment illustrated in FIGS. 5 to 8.

The solution of FIG. 11 differs from the solution of FIG. 10 by the different shape of the annular sealing element 40 and of the circular housing slot or seat 41 in the cross hole 32 of the bush 30, thus always permitting a dual seal as in the preceding case.

According to the example in FIG. 11 the annular sealing element 40 comprises a first cylindrical part 42, having inner and outer cylindrical surfaces and a cross section with a substantially constant thickness, that extends as far as the contact interface 30.1 between the bush 30 and the body 10, and an annular ridge 43, having a circular cross-sectional shape, housed in a corresponding seat in the bush 30 to retain the annular sealing element 40.

Again, the fact that the housing seat and the annular sealing element 40 housed therein extend as far as the interface 30.1 provided by the contact zone between the bush 30 and the body portion 10, improves the seal between the mixing chamber 11 and the delivering conduit 12, in the totally advanced condition of the valve member 13.

Figure 12:
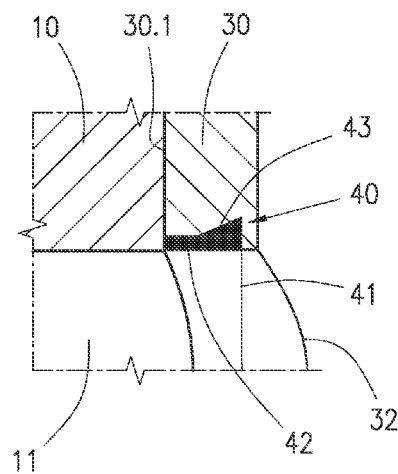

FIG. 12 illustrates a further version; in this case the annular sealing element 40 has again a first cylindrical part 42, still bounded by cylindrical surfaces, which extends as far as the interface 30.1, and an annular ridge 43 having a conical outer face and a triangular cross sectional shape, housed in a correspondingly shaped seat for retaining the sealing element 40 in both the axial directions.

Figure 13:
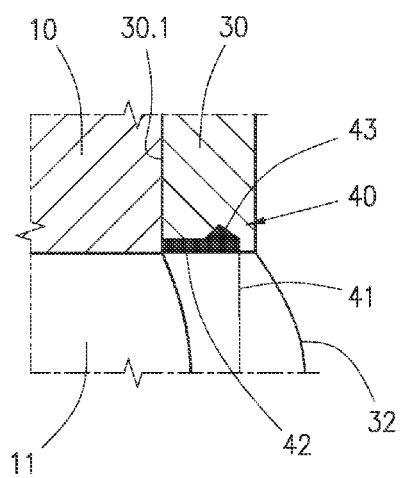

FIG. 13 illustrates a further version of the annular sealing element 40 that always consists of a first cylindrical part 42 having a cross sectional shape of substantially constant width, and a second part 43 in the shape of a ridge of configured with opposite conical outer surfaces.

Figure 14:
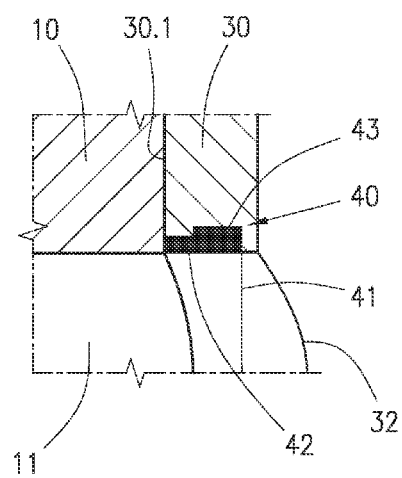

FIG. 14 shows a further solution for the annular sealing element 40, and the sealing seat, has a first cylindrical part 42 that extends towards the interface 30.1, and a second cylindrical part 43, of greater diameter, housed in a suitable seat for anchoring the annular sealing element 40 to the bush 30, and for again preventing the annular seal element 40 from being dragged and removed by the valve member during axial movement thereof.

Figures 15, 16:
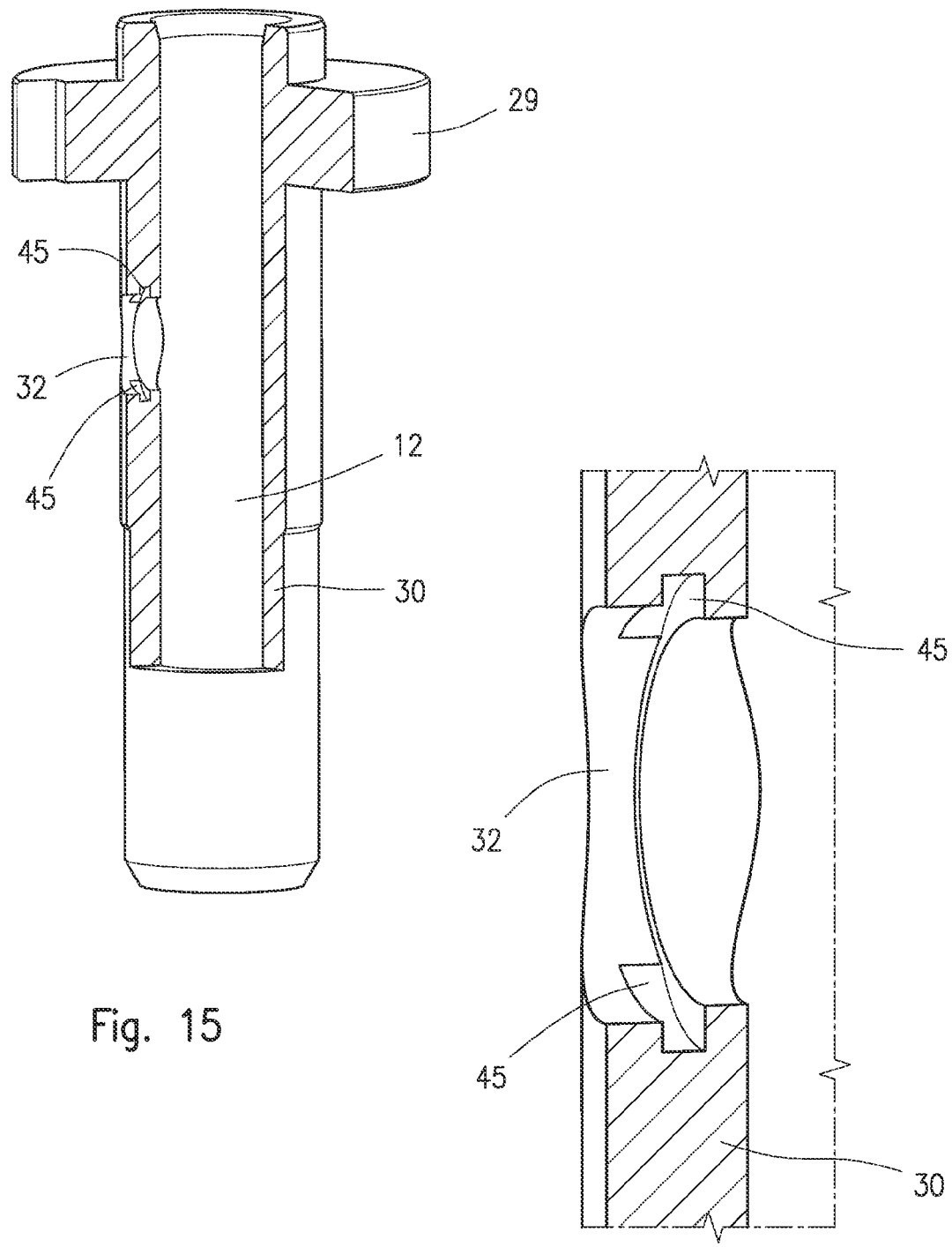
FIG. 15 is a sectional view of the bush of FIG. 4, that shows a further embodiment of the annular sealing element.
FIG. 16 is an enlarged detail of FIG. 15, before the formation of the annular sealing element.
Figure 17:
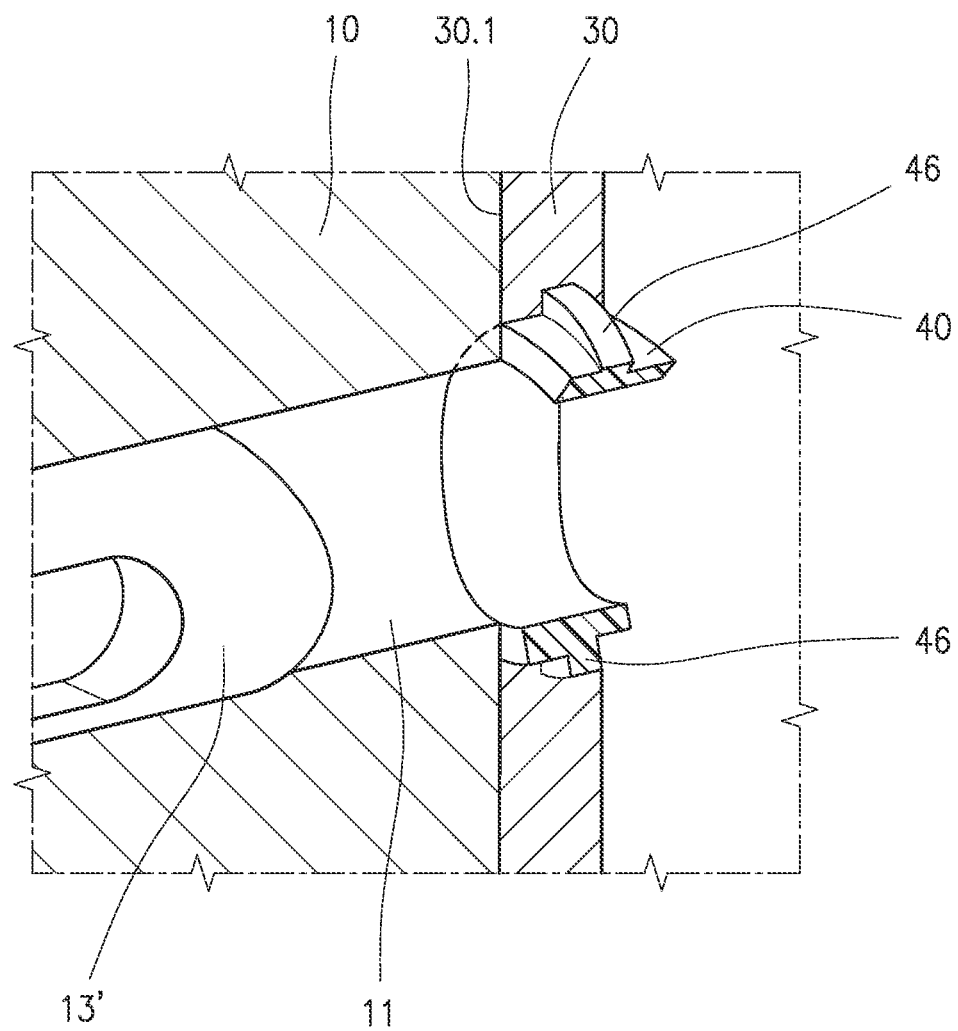
FIG. 17 is a similar detail to that of FIG. 16, after the formation of the annular sealing element.

FIGS. 15 to 17 show a further version of the housing seat and the annular sealing element 40; the solution of FIGS. 15-17 is particularly suitable if the bush 30 is of small diameter or has a cylindrical wall of reduced thickness compared to previous solutions; again in FIGS. 15-17 the same reference numbers as in the previous figures have been used to indicate similar or equivalent parts.

In this case the housing seat for the annular sealing element 40 is configured by a cross hole of the bush 30, having a greater diameter than the mixing chamber 11; as shown in FIG. 17, the sealing element 40 extends on both outer sides of the bush 30, both towards the delivering conduit 12 and towards the contact interface 30.1 between bush 30 and body 10 of the apparatus. In the case of FIGS. 15 to 17, as shown in the detail of FIG. 16, to anchor the annular sealing element 40 to the bush 30, arch-shaped grooves 45 are provided in the latter, into which the resin can penetrate, forming corresponding anchoring toothings 46 shown in FIG. 17; in all cases, the toothings 46 prevent the resin from possibly running when dragged by the valve member 13.

The angular extent, the thickness and depth of the arch-shaped grooves 45, can vary according to the needs and dimensions of the bush 30. In the case shown, the grooves 45 have a depth that gradually decreases one end to the other end; other forms of grooves 45 are of course possible.

According to the invention, a method has thus provided for forming a self-regenerating seal, in a high-pressure mixing apparatus for chemically reactive polymeric components, for example for forming polyurethane mixtures, in which the apparatus comprises at least one mixing chamber 11 and a valve member 13 that is made axially reciprocate between an advanced closing condition for the mixing chamber 11, and a retracted opening position in which the mixing chamber 11 communicates with a delivering conduit 12 for the reactive mixture, which extends orthogonally to the mixing chamber 11, according to which:

at least one circular seat 34, 41 for housing a sealing element is formed in the internal cylindrical surface of the mixing chamber 11, or on an extension thereof, at a sealing zone towards the delivering conduit 12, downstream injection holes for the chemical components;

forming an annular sealing element 17, 35, into the seat 34, 41 by spreading a polymerisable resin and filling the housing seat with the polymerisable resin or with the same reactive mixture; and self-generating worn and/or torn parts of the annular seal element during the operation of the mixing apparatus, with the same reactive mixture that is left to polymerize in the worn and/or torn parts or cavities of the annular seal element thus restoring its continuity.

Comparative tests have been conducted between a conventional mixing apparatus, provided with a sealing element on the valve member of the mixing chamber, and a mixing apparatus according to the present invention; from the tests it has been established that in a conventional apparatus the seal wore out early, so that it was necessary to replace the sealing member after a relatively small number of disworking cycles, on average 50,000 working cycles. On the other hand, by positioning the annular sealing element in a housing seat provided inside the mixing chamber or an extension thereof, according to the previously illustrated embodiments, the useful working life of the mixing apparatus was significantly extended; in this case it was established that after 400,000 working cycles it was not necessary to intervene to reconstruct the sealing element 35, 40, with an increase of the useful life of the seal and a consequent increase of productivity.

From what has been said and shown in the embodiment of the attached drawings, it is thus clear that a method and a high-pressure mixing apparatus for chemically reactive polymeric components have been provided, for example for the production of both flexible and rigid polyurethane foams, characterized by a seal between mixing chamber and delivering conduit that self-generates continuously with the same reactive mixture dispensed during normal operation of the apparatus. It is thus understood that other modifications or variations can be made to the apparatus or the parts thereof without thereby departing the claims.

What we claim is:

1. A method for forming a self-regenerating seal into a mixing chamber of a high pressure mixing apparatus, comprising the steps of:

feeding a first and at least a second polymeric component to the mixing chamber through injection holes, to form a reactive polymeric mixture, to be dispensed by a delivery conduit, in which a slidable valve member is reciprocable in the mixing chamber between a retracted position, and an advance position to open and respectively close the injection holes and the mixing chamber in respect to the delivery conduit;

providing at least one annular seat for housing an annular sealing element on an inner surface of the mixing chamber in a sealing zone downstream of the injection holes;

providing an annular sealing element in said at least one annular housing seat by a polymerisable resin; and automatically regenerating worn and/or torn parts of the annular sealing element, by allowing the reactive mixture to fill up and polymerize into the worn and/or torn parts of the sealing element, inside the annular housing seat.

2. The method for forming a self-regenerating seal according to claim 1, initially forming said annular sealing element by filling the annular housing seat, by the same polymeric mixture.

3. The method for forming a self-regenerating seal according to claim 1, forming the annular sealing element by spreading a synthetic resin comprising a filler, into the annular housing seat.

4. The method for forming a self-regenerating seal according to claim 1, providing the annular housing seat for the annular sealing element, inside a cross hole of a bush configured with a delivery conduit for dispensing the reactive mixture, the cross hole of the bush being axially aligned and consisting of an extension of the mixing chamber.

5. The method for forming a self-regenerating seal according to claim 4, providing the annular sealing element in the annular housing seat having at least one open side, facing the delivering conduit and/or a contact interface between an outer surface of the bush and a facing surface of a body portion of the mixing apparatus.

6. The method for forming a self-regenerating seal according to claim 5, configuring the annular housing seat for the annular sealing element with arch-shaped or circumferential grooves, and configuring the annular sealing element with protrusions extending into said arch-shaped or circumferential grooves.

* * * * *